United States Patent
Feng et al.

(10) Patent No.: US 11,873,412 B2
(45) Date of Patent: Jan. 16, 2024

(54) AQUEOUS FLUORESCENT INK AND PREPARATION METHOD AND USE THEREOF

(71) Applicant: Harbin Institute of Technology, Shenzhen, Shenzhen (CN)

(72) Inventors: Huanhuan Feng, Shenzhen (CN); Min Wang, Shenzhen (CN); Kunkun Jiang, Shenzhen (CN); Yueyue Zhang, Shenzhen (CN); Zhenchao Zhang, Shenzhen (CN); Weiwei Zhao, Shenzhen (CN); Xing Ma, Shenzhen (CN); Jiaheng Zhang, Shenzhen (CN); Tingting Zheng, Shenzhen (CN)

(73) Assignee: Harbin Institute of Technology, Shenzhen, Shenzhen (CN)

( * ) Notice: Subject to any disclaimer, the term of this patent is extended or adjusted under 35 U.S.C. 154(b) by 293 days.

(21) Appl. No.: 17/177,444

(22) Filed: Feb. 17, 2021

(65) Prior Publication Data
US 2022/0127481 A1 Apr. 28, 2022

(30) Foreign Application Priority Data

Oct. 27, 2020 (CN) .......................... 202011161381.3

(51) Int. Cl.
*C09D 11/50* (2014.01)
*C09D 11/328* (2014.01)
(Continued)

(52) U.S. Cl.
CPC ................ *C09D 11/50* (2013.01); *C08K 5/42* (2013.01); *C08L 25/06* (2013.01); *C09D 11/328* (2013.01);
(Continued)

(58) Field of Classification Search
CPC ..... C09D 11/50; C09D 11/328; C09D 125/06; C09D 11/106; C09D 11/38; C09D 11/30;
(Continued)

(56) References Cited

U.S. PATENT DOCUMENTS

| 2006/0108564 A1* | 5/2006 | Lowe ........................ G01L 1/24 549/80 |
| 2006/0293409 A1* | 12/2006 | Sanchez ............... C09D 11/322 523/160 |
| 2013/0165006 A1* | 6/2013 | Yoshino ............. C08G 18/3206 442/86 |

FOREIGN PATENT DOCUMENTS

| CN | 104031477 A * | 9/2014 |
| CN | 109575691 A * | 4/2019 ............. C09D 11/03 |
| WO | WO-2018043416 A1 * | 3/2018 ................ B41J 2/01 |

OTHER PUBLICATIONS

English Machine Translation of CN109575691A ("Machine_Translation_Feng_CN_109575691_A") (Year: 2019).*
(Continued)

*Primary Examiner* — Jennifer A Smith
*Assistant Examiner* — Jeffrey Eugene Barzach
(74) *Attorney, Agent, or Firm* — Millen, White, Zelano & Branigan P.C.; William F. Nixon (57) ABSTRACT

Disclosed is an aqueous fluorescent ink and a preparation method and use thereof. The aqueous fluorescent ink provided by the present disclosure includes 0.10%-0.14% of polystyrene micro-spheres, 0.010%-0.014% of fluorescent dyes, 0.4%-0.6% of surfactants, and the balance of water. The present disclosure uses polystyrene micro-spheres as a fluorescent dye carrier, which is colorless and transparent under ordinary daylight and completely invisible, and displays fluorescence only when irradiated by ultraviolet light and has high fluorescence intensity. The surfactant makes the polystyrene fluorescent micro-spheres uniformly dis-
(Continued)

persed in the fluorescent ink, and the stability of the fluorescent ink is improved. Water is used as a solvent, which has excellent safety and environmental friendliness. The accuracy of the printed patterns can reach 30 μm, which can help realize large-format ultra-high-precision patterned anti-counterfeiting encryption printing. Through precision printing, the two-dimensional code can be implemented with one code for one object, and has excellent anti-counterfeiting ability.

6 Claims, 3 Drawing Sheets

(51) Int. Cl.
    *C09D 11/06*     (2006.01)
    *C08K 5/42*     (2006.01)
    *C08L 25/06*     (2006.01)
    *C09K 11/06*     (2006.01)
    *C09D 125/06*     (2006.01)
    *C09D 11/106*     (2014.01)
    *C09D 11/38*     (2014.01)
    *C09D 11/30*     (2014.01)

(52) U.S. Cl.
    CPC ............ *C09K 11/06* (2013.01); *C08L 2205/18* (2013.01); *C09K 2211/1416* (2013.01); *C09K 2211/1483* (2013.01)

(58) Field of Classification Search
    CPC ....... C08K 5/42; C08L 25/06; C08L 2205/18; C09K 11/06; C09K 2211/1416; C09K 2211/1483
    See application file for complete search history.

(56) References Cited

OTHER PUBLICATIONS

Borges, Bruno Gal, et al. "Surface, interface and electronic properties of F8:F8BT polymeric thin films used for organic light-emitting diode applications." Polymer International, vol. 67, No. 6, 2018, pp. 691-699, https://doi.org/10.1002/pi.5552. (Year: 2018).*

Voigt, M, et al. "The interplay between the optical and electronic properties of light-emitting-diode applicable conjugated polymer blends and their phase-separated morphology." Organic Electronics, vol. 6, No. 1, 2005, pp. 35-45, https://doi.org/10.1016/j.orgel.2005.02.002. (Year: 2005).*

English machine translation of CN-104031477-A (Year: 2014).*
English machine translation of WO-2018043416-A1 (Year: 2018).*

* cited by examiner

Particle size (d.nm)

AQUEOUS FLUORESCENT INK AND PREPARATION METHOD AND USE THEREOF

TECHNICAL FIELD

The present disclosure relates to the technical field of anti-counterfeiting inks, in particular to an aqueous fluorescent ink and a preparation method and use thereof.

BACKGROUND

With the continuous development of the global economy, counterfeit goods frequently appear, causing serious economic losses every year. In order to determine the authenticity of the goods, the most effective and convenient way is to use anti-counterfeiting technology to facilitate identification. Fluorescent anti-counterfeiting is currently one of the most extensively used anti-counterfeiting technologies. Fluorescent anti-counterfeiting inks are used for printing invisible anti-counterfeiting marks, texts, images and other contents for product anti-counterfeiting and important document anti-counterfeiting needs. They are distinguished by excitation light, including ultraviolet (UV) anti-counterfeiting, infrared anti-counterfeiting, etc. Among them, the UV anti-counterfeiting ink is the one most widely used. It is prepared by using UV light to excitate a fluorescent material, which is invisible under ordinary light, and only visible under a specific UV light environment.

The UV anti-counterfeiting inks currently sold on the market can be divided into fluorescent inks and quantum dot inks from the perspective of materials. Among them, the fluorescent molecules used in the fluorescent inks are all oil-soluble with poor stability, and also have safety and environmental protection issues. Currently, the fluorescent inks are often used in offset printing to produce two-dimensional codes, but the accuracy is low and the anti-counterfeiting ability is poor. Although quantum dot inks can avoid the safety and environmental protection problems caused by the use of oily solvents, they have a short service life and low fluorescence intensity. In the prior art, rare earth elements are usually doped to increase the fluorescence intensity of quantum dot inks. Ink-jet printers are currently available for printing quantum dot inks, but the pattern accuracy is low, and large-format ultra-high-precision patterned anti-counterfeiting encryption printing cannot be realized.

Therefore, an aqueous fluorescent anti-counterfeiting ink with excellent stability, long service life and high precision is needed.

SUMMARY

An objective of the present disclosure is to provide an aqueous fluorescent ink and a preparation method and use thereof. The aqueous fluorescent ink provided by the present disclosure has excellent stability and long service life and enables high precision printing.

The present disclosure provides an aqueous fluorescent ink including the following components by mass content: 0.10%-0.14% of polystyrene micro-spheres, 0.010%-0.014% of fluorescent dye, 0.4%-0.6% of surfactant and the balance of water.

Preferably, the aqueous fluorescent ink may include the following components by mass content: 0.12% of polystyrene micro-spheres, 0.012% of fluorescent dye, 0.5% of surfactant and the balance of water.

Preferably, the fluorescent dye may include one or both of poly(9,9-dioctylfluorene) (PFO) and poly(9,9-dioctylfluorene-co-benzothiadiazole) (F8BT).

Preferably, a mass content of PFO in the fluorescent dye may be 100%-80%; and a mass content of F8BT in the fluorescent dye may be 0%-20%.

Preferably, the surfactant may include one of sodium lauryl sulfate, sodium dodecyl sulfonate and sodium dodecyl benzene sulfonate.

The present disclosure also provides a preparation method of the aqueous fluorescent ink according to the previous technical solutions, including the following steps:
step (1): mixing polystyrene micro-spheres with an organic solvent and a fluorescent dye to obtain a fluorescent solution;
step (2): mixing the fluorescent solution obtained in step (1) with surfactant and water to obtain a homogeneous system;
step (3): removing the organic solvent from the homogeneous system obtained in step (2) to obtain the aqueous fluorescent ink.

Preferably, the organic solvent in step (1) may be toluene or benzene.

Preferably, in step (3), the polystyrene fluorescent micro-spheres may be crushed before the organic solvent is removed from the homogeneous system.

The present disclosure also provides use of the aqueous fluorescent ink according to the previous technical solutions or an aqueous fluorescent ink prepared according to the preparation method according to the previous technical solutions in a precision ink-jet printer.

Preferably, the aqueous fluorescent ink may be mixed with a thickener before printing.

The present disclosure provides an aqueous fluorescent ink including the following components by mass content: 0.10%-0.14% of polystyrene micro-spheres, 0.010%-0.014% of fluorescent dyes, 0.4%-0.6% of surfactant, and the balance of water. The aqueous fluorescent ink provided in the present disclosure uses polystyrene micro-spheres as a fluorescent dye carrier, which is colorless and transparent under ordinary daylight and displays fluorescence when irradiated by UV light. The addition of surfactant makes the fluorescent micro-spheres uniformly dispersed in the fluorescent ink, and the stability of the fluorescent ink is improved. Water is used as a solvent, which has excellent safety and environmental friendliness. The dosage of each component is controlled, the accuracy of ink-jet printing patterns is improved, and the anti-counterfeiting ability is also improved. The experimental results show that the polystyrene fluorescent micro-spheres in the aqueous fluorescent ink provided by the present disclosure are uniformly dispersed and have excellent stability (the fluorescent micro-spheres hardly agglomerate after being placed at room temperature for 9 d). The aqueous fluorescent inks of the present disclosure are colorless, transparent and completely invisible under ordinary daylight, and display fluorescence only when irradiated by UV light, with high fluorescence intensity and long fluorescence lifetime (0.025 ns). The accuracy of the printed patterns can reach 30 μm, which can help realize large-format ultra-high-precision patterned anti-counterfeiting encryption printing. Through precision printing, the two-dimensional code can be implemented with one code for one object, and has excellent anti-counterfeiting ability.

DETAILED DESCRIPTION

The present disclosure provides an aqueous fluorescent ink, which includes the following components by mass content: 0.10%-0.14% of polystyrene micro-spheres, 0.010%-0.014% of fluorescent dyes, 0.4%-0.6% of surfactant, and the balance of water.

In terms of mass content, the aqueous fluorescent ink provided by the present disclosure may include 0.10%-0.14% of polystyrene micro-spheres, preferably 0.12% of polystyrene micro-spheres. In the present disclosure, the polystyrene micro-spheres are used as a carrier for the fluorescent dye. The present disclosure does not specifically limit the source of the polystyrene micro-spheres, and commercially available products well known to those skilled in the art can be used. The present disclosure does not specifically limit the particle size of the polystyrene micro-spheres, and the particle size range of the polystyrene micro-spheres conventional in the art may be adopted. In the present disclosure, the particle size of the polystyrene micro-spheres may be preferably 30 nm-120 nm.

In terms of mass content, the aqueous fluorescent ink provided by the present disclosure may include 0.010%-0.014% of fluorescent dye, preferably 0.012% of fluorescent dye. The present disclosure limits the mass content of the fluorescent dye within the above-mentioned range, which can increase the fluorescence intensity.

In the present disclosure, the fluorescent dye may preferably include one or both of PFO and F8BT.

In the present disclosure, the molecular structure of the PFO is shown in formula I:

Formula I where R=$CH_2(CH_2)_6CH_3$.

In the present disclosure, the number average molecular weight $M_n$ of the PFO may be preferably 14,000-15,000 Daltons, more preferably 14,311 Daltons. The weight average molecular weight $M_w$ may be preferably 19,000-20,000 Daltons, more preferably 19,222 Daltons. The peak molecular weight MP may be preferably 15,000-16,000 Daltons, more preferably 15,292 Daltons. The Z average molecular weight $M_z$ may be preferably 25,000-26,000 Daltons, more preferably 25,990 Daltons. The Z+1 average molecular weight $M_{z+1}$ may be preferably 34,000-35,000 Daltons, more preferably 34,439 Daltons. The polydispersity may be preferably 1.300000-1.400000, more preferably 1.343157.

In the present disclosure, the molecular structure of F8BT is shown in formula II:

Formula II

In the present disclosure, the number average molecular weight $M_n$ of the F8BT may be preferably 23,000-24,000 Daltons, more preferably 23,064 Daltons. The weight average molecular weight $M_w$ may be preferably 48,000-49,000 Daltons, more preferably 48,197 Daltons. The peak molecular weight MP may be preferably 34,000-35,000 Daltons, more preferably 34,516 Daltons. The Z average molecular weight $M_z$ may be preferably 10,000-11,000 Daltons, more preferably 108,578 Daltons. The Z+1 average molecular weight $M_{z+1}$ may be preferably 200,000-21,000 Daltons, more preferably 206,211 Daltons. The polydispersity may be preferably 2.000000-2.100000, more preferably 2.089722.

Taking the mass content of the fluorescent dye as 100%, the mass content of PFO in the fluorescent dye may be preferably 100%-80%, more preferably 96%, and the mass content of F8BT in the fluorescent dye may be preferably 0%-20%, more preferably 4%. In the present disclosure, there is a fluorescence resonance energy transfer effect between the PFO and the F8BT, that is, the fluorescence spectrum of the PFO molecule partially overlaps the excitation spectrum of the F8BT molecule, where the excitation of the PFO molecule induces the fluorescence of the F8BT molecule, and the intensity of the fluorescence of the PFO molecule itself is weakened. The ratio of the two fluorescent dyes can be adjusted to adjust the fluorescence resonance energy transfer, thereby obtaining aqueous fluorescent inks with different fluorescence intensities and colors.

In the present disclosure, the source of the fluorescent dye is not particularly limited, and a commercially available product well known to those skilled in the art can be used.

In terms of mass content, the aqueous fluorescent ink provided by the present disclosure may include 0.4%-0.6% of surfactant, preferably 0.5% of surfactant. In the present disclosure, the surfactant may preferably include one of sodium lauryl sulfate, sodium dodecyl sulfonate and sodium dodecyl benzene sulfonate, and more preferably sodium lauryl sulfate. In the present disclosure, the surfactant can uniformly disperse the polystyrene fluorescent micro-spheres in the fluorescent ink and improve the stability of the aqueous fluorescent ink. In the present disclosure, the source of the surfactant is not particularly limited, and commercially available products well known to those skilled in the art can be used.

In terms of mass content, the balance in the aqueous fluorescent ink provided by the present disclosure is water. In the present disclosure, the water is a solvent, which has excellent safety and environmental friendliness. The present disclosure does not specifically limit the type and source of the water, and the water source is well known to those skilled in the art can be used.

The aqueous fluorescent ink provided by the present disclosure uses polystyrene micro-spheres as a fluorescent dye carrier, which is colorless and transparent under ordinary daylight conditions, and can emit fluorescence under the action of UV light. The addition of surfactant makes the fluorescent micro-spheres uniformly dispersed In the fluorescent ink, and the stability of the fluorescent ink is improved. Water is used as a solvent, which has excellent safety and environmental friendliness. The dosage of each component is controlled to improve the accuracy of ink-jet printing patterns and improve the anti-counterfeiting ability.

The present disclosure also provides a preparation method of the aqueous fluorescent ink according to the previous technical solutions, including the following steps:

step (1): mixing polystyrene micro-spheres with an organic solvent and a fluorescent dye to obtain a fluorescent solution;

step (2): mixing the fluorescent solution obtained in step (1) with surfactant and water to obtain a homogeneous system;

step (3): removing the organic solvent from the homogeneous system obtained in step (2) to obtain the aqueous fluorescent ink.

In the present disclosure, polystyrene micro-spheres are mixed with an organic solvent and a fluorescent dye to obtain a fluorescent solution.

In the present disclosure, the organic solvent may be preferably toluene or benzene, more preferably toluene. In a preferred embodiment of the present disclosure, the toluene is less toxic.

In the present disclosure, the mass ratio of the polystyrene micro-spheres to the organic solvent may be preferably 1:(98-101), more preferably 1:99.

In the present disclosure, the operation of mixing polystyrene micro-spheres with an organic solvent and a fluorescent dye is not particularly limited, and a mixing technical solution well known to those skilled in the art may be adopted. In the present disclosure, it may be preferable to add the fluorescent dye after the polystyrene micro-spheres are mixed with the organic solvent.

In the present disclosure, after obtaining the fluorescent solution, the fluorescent solution is mixed with the surfactant and water to obtain a homogeneous system.

In the present disclosure, the operation of mixing the fluorescent solution with surfactant and water is not particularly limited, and a mixing technical solution well known to those skilled in the art may be adopted. In the present disclosure, it may be preferable to add the fluorescent solution after the surfactant is mixed with water.

In the present disclosure, the mixing of the fluorescent solution with the surfactant and water may be preferably performed under stirring. The stirring may be preferably magnetic stirring. The rotation speed of the stirring may be preferably 250 r/min-350 r/min, more preferably 300 r/min. The stirring time may be preferably 0.5 h-1.5 h, more preferably 1 h. The stirring temperature may be preferably 20° C.-30° C., more preferably 25° C. In the present disclosure, there is no special limitation on the instrument used in the stirring process, and an instrument well known to those skilled in the art can be used. In the present disclosure, the stirring may be preferably performed in a magnetic rotary machine.

In the present disclosure, after the homogeneous system is obtained, the organic solvent is removed from the homogeneous system to obtain the aqueous fluorescent ink.

In the present disclosure, there is no special limitation on the operation of removing the organic solvent from the homogeneous system, and the technical solution for removing the organic solvent well known to those skilled in the art may be adopted. In the present disclosure, the operation of removing the organic solvent may be preferably performed under stirring. The speed of the stirring may be preferably 250 r/min-350 r/min, more preferably 300 r/min, and the stirring time may be preferably 24 h-48 h, more preferably 40 h, so as to completely volatilize the organic solvent. The stirring temperature may be preferably 20° C.-30° C., more preferably 25° C. In the present disclosure, there is no special limitation on the instrument used in the process of removing the organic solvent, and an instrument well known to those skilled in the art may be adopted. In the present disclosure, the removal of the organic solvent may be preferably performed in a magnetic rotary machine.

In the present disclosure, the polystyrene fluorescent micro-spheres may be preferably crushed before the organic solvent is removed from the homogeneous system. In the present disclosure, the crushing may be preferably performed on a cell crusher. In a preferred embodiment of the present disclosure, the cell crusher can not only reduce the particle size of the polystyrene fluorescent micro-spheres, but also has a homogenizing effect and can further uniformly disperse the polystyrene fluorescent micro-spheres. In the present disclosure, the power of the cell crusher may be preferably 5%-15%, more preferably 10%. The working time of the cell crusher may be preferably 50 min-70 min, more preferably 60 min. The number of cycles of the cell crusher may be preferably 4-7, more preferably 5. In the present disclosure, after crushing, the particle size of the polystyrene fluorescent micro-spheres may be preferably 20-120 nm, more preferably 30-80 nm.

The preparation method provided by the present disclosure is easy to operate, controls the amounts of components and various process parameters, makes the polystyrene micro-spheres smaller in particle size and uniformly dispersed, and improves the stability and printing accuracy of the aqueous fluorescent ink.

The present disclosure also provides use of the aqueous fluorescent ink described in the previous technical solution or the aqueous fluorescent ink prepared according to the preparation method described in the previous technical solution in a precision ink-jet printer.

The present disclosure does not specifically limit the operation of the use of the aqueous fluorescent ink in the precision ink-jet printer, and a printing method of the aqueous fluorescent ink in the precision ink-jet printer well known to those skilled in the art may be adopted.

In the present disclosure, it may be preferable to mix the aqueous fluorescent ink and a thickener for precision ink-jet printing. In the present disclosure, the thickener may be preferably polyethylene glycol. In the present disclosure, the thickener can increase the viscosity and surface tension of the aqueous fluorescent ink, so as to meet the requirements of precision printers for the viscosity and surface tension of the ink.

In the present disclosure, the volume ratio of the aqueous fluorescent ink to the thickener may be preferably 1:(0.5-1.5), more preferably 1:1. In the present disclosure, the viscosity of the ink after the aqueous fluorescent ink is mixed with the thickener may be preferably 10-11 mPa·s, more preferably 10.2 mPa·s. The surface tension of the ink after the aqueous fluorescent ink is mixed with the thickener may be preferably 44-46 mN/m, more preferably 44.96 mN/m.

The technical solutions of the present disclosure will be clearly and completely described below in conjunction with the embodiments of the present disclosure. Obviously, the described embodiments are only a part of the embodiments of the present disclosure, rather than all the embodiments. On the basis of the examples of the present disclosure, all other embodiments obtained by those of ordinary skill in the art without an inventive step shall fall within the protection scope of the present disclosure.

Example 1

In terms of mass content, a composition of aqueous fluorescent ink was 0.12% of polystyrene micro-spheres, 0.012% of fluorescent dye (the mass content of PFO in the fluorescent dye was 100%, and the mass content of F8BT was 0%), 0.5% of sodium lauryl sulfate and 99.368% of water.

In this example, the $M_n$ of PFO was 14,311 Daltons, $M_w$ was 19,222 Daltons, MP was 15,292 Daltons, $M_z$ was 25,990 Daltons, $M_{z+1}$ was 34,439 Daltons, and the polydispersity was 1.343157. The $M_n$ of F8BT was 23,064 Daltons, $M_w$ was 48,197 Daltons, MP was 34,516 Daltons, $M_z$ was 108,578 Daltons, $M_{z+1}$ was 206,211 Daltons, and polydispersity was 2.089722.

The preparation method of the aqueous fluorescent ink in this example included:
- step (1): 0.1 g of polystyrene micro-spheres was dissolved in 9.9 g of toluene where the mass ratio of the polystyrene micro-spheres to the toluene was 1:99, and 0.01 g of fluorescent dye (PFO) was added to obtain a fluorescent solution;
- step (2): 0.07 g of sodium lauryl sulfate was added to 14 g of water, and then 2 ml of the fluorescent solution in step (1) was added, and stirred on a magnetic rotary machine at 25° C. and 300 r/min for 1 h to obtain a homogeneous system;
- step (3): the homogeneous system obtained in step (2) was crushed on a cell crusher for 5 cycles with the power of 10% and working time of 1 min, and then stirred on a magnetic rotary machine at 25° C. and 300 r/min for 40 h until the toluene volatilized completely to obtain the aqueous fluorescent ink $S_{3-1}$.

Example 2

The mass content of PFO in the fluorescent dye was 99% (0.0099 g), and the mass content of F8BT was 1% (0.0001 g). Other features were the same as those in Example 1, and an aqueous fluorescent ink $S_{3-2}$ was obtained.

Example 3

The mass content of PFO in the fluorescent dye was 98% (0.0098 g), and the mass content of F8BT was 2% (0.0002 g). Other features were the same as those in Example 1, and an aqueous fluorescent ink $S_{3-3}$ was obtained.

Example 4

The mass content of PFO in the fluorescent dye was 97% (0.0097 g), and the mass content of F8BT was 3% (0.0003 g). Other features were the same as those in Example 1, and an aqueous fluorescent ink $S_{3-4}$ was obtained.

Example 5

The mass content of PFO in the fluorescent dye was 96% (0.0096 g), and the mass content of F8BT was 4% (0.0004 g). Other features were the same as those in Example 1, and an aqueous fluorescent ink $S_{3-5}$ was obtained.

Example 6

The mass content of PFO in the fluorescent dye was 95% (0.0095 g), and the mass content of F8BT was 5% (0.0005 g). Other features were the same as those in Example 1, and an aqueous fluorescent ink $S_{3-6}$ was obtained.

Example 7

The mass content of PFO in the fluorescent dye was 94% (0.0094 g), and the mass content of F8BT was 6% (0.0006 g). Other features were the same as those in Example 1, and an aqueous fluorescent ink $S_{3-7}$ was obtained.

Example 8

The mass content of PFO in the fluorescent dye was 93% (0.0093 g), and the mass content of F8BT was 7% (0.0007 g). Other features were the same as those in Example 1, and an aqueous fluorescent ink $S_{3-8}$ was obtained.

Example 9

The aqueous fluorescent ink of Example 5 was mixed with polyethylene glycol at a volume ratio of 1:1 to obtain a precision printing ink. The viscosity of the ink was 10.2 mPa·s and the surface tension was 44.96 mN/m. This printing ink can be used in printing.

Example 10

Figure 1:
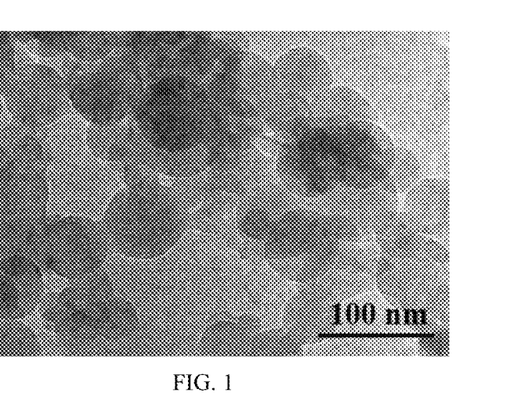
FIG. 1 is a transmission electron micrograph of polystyrene micro-spheres in Example 5.
Figure 2:
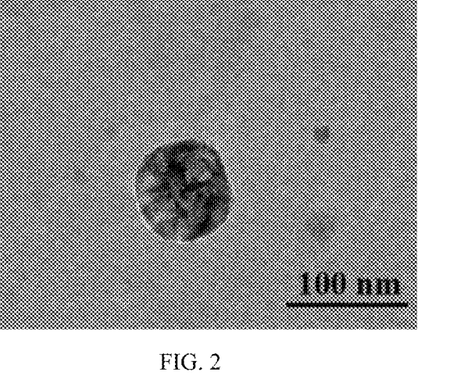
FIG. 2 is a transmission electron micrograph of polystyrene fluorescent micro-spheres in the aqueous fluorescent ink of Example 5.

A transmission electron microscope was used to detect the polystyrene micro-spheres in Example 5 and the polystyrene fluorescent micro-spheres in the aqueous fluorescent ink, and the detection results were shown in FIGS. 1 and 2. FIG. 1 was a transmission electron micrograph of the polystyrene micro-spheres in Example 5, and FIG. 2 was a transmission electron micrograph of the polystyrene fluorescent micro-spheres in the aqueous fluorescent ink of Example 5. It can be seen from FIG. 1 and FIG. 2 that the polystyrene micro-spheres had poor dispersibility and large particle size, while the polystyrene fluorescent micro-spheres in the aqueous fluorescent ink were monodisperse with excellent dispersion and smaller particle size.

Figure 3:
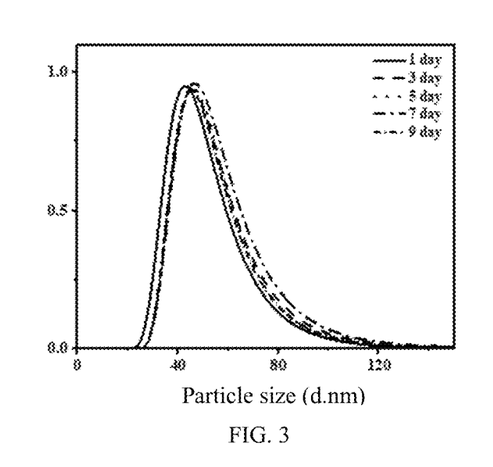
FIG. 3 is a graph showing a particle size distribution of the polystyrene fluorescent micro-spheres after the printing ink of Example 9 is placed at room temperature for different days.

After the aqueous fluorescent ink of Example 5 was placed at room temperature for different days, a Malvern particle sizer was used to perform spectral dynamic light scattering to measure the change in particle size of the polystyrene fluorescent micro-spheres in the aqueous fluorescent ink. The detection result was shown in FIG. 3. It can be seen from FIG. 3 that the polystyrene fluorescent micro-spheres in the aqueous fluorescent ink of Example 5 of the present disclosure were evenly dispersed. The particle size was mainly 30-80 nm, the average particle size was 50 nm, and the particle size was smaller. After the fluorescent micro-spheres were placed at room temperature for different days, the particle size of the fluorescent micro-spheres changed little, with basically no agglomeration and excellent stability.

Figure 4:
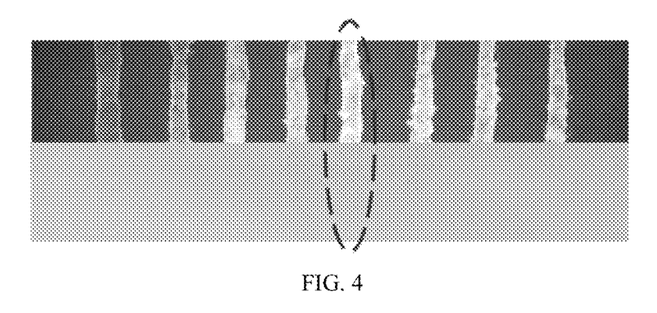
FIG. 4 shows the color development of the aqueous fluorescent inks of Examples 1-8 under 365 nm UV light and ordinary daylight conditions after being painted on the paper.
Figure 5:
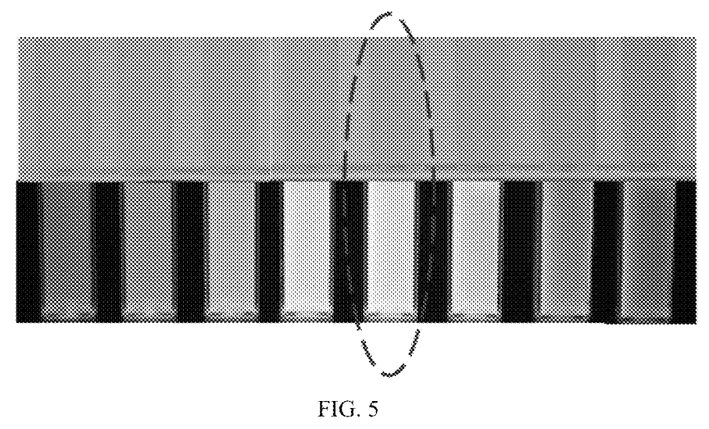
FIG. 5 shows the color development of the aqueous fluorescent inks of Examples 1-8 under ordinary daylight and 365 nm UV light.
Figure 6:
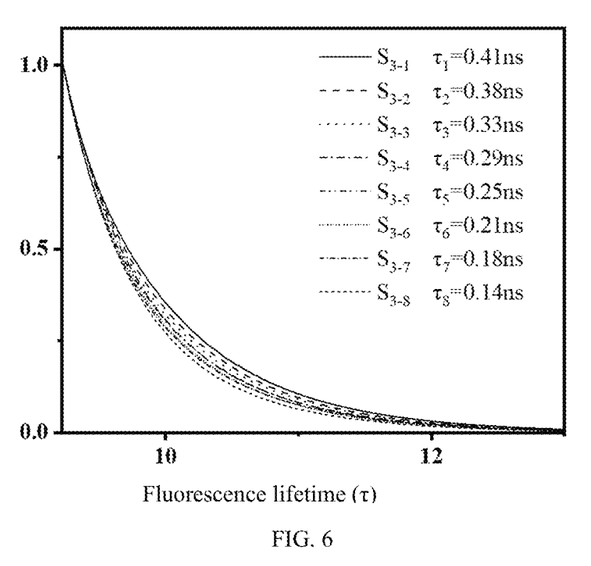
FIG. 6 shows fluorescence lifetime of the aqueous fluorescent inks of Examples 1-8.

The changes in the fluorescence intensity, color, and fluorescence lifetime of the aqueous fluorescent inks in the aqueous fluorescent inks of Examples 1-8 were measured with different mass contents of PFO and F8BT. The detection results were shown in FIGS. 4, 5 and 6. The upper part of FIG. 4, from left to right, showed the color development of aqueous fluorescent inks from Examples 1-8 under 365 nm UV light after the fluorescent inks were painted on the paper, and the lower part, from left to right, showed the color development of aqueous fluorescent inks from Examples 1-8 under normal daylight conditions after the fluorescent inks were painted on the paper. The upper part of FIG. 5, from left to right, showed the color development of aqueous fluorescent inks from Examples 1-8 under normal daylight conditions, and the lower part, from left to right, showed the color development of the aqueous fluorescent inks of Examples 1-8 under 365 nm UV light. FIG. 6 showed the fluorescence lifetime of the aqueous fluorescent inks of Examples 1-8. It can be seen from FIGS. 4 and 6 that the aqueous fluorescent ink provided by the present disclosure was colorless and transparent under ordinary daylight conditions after being painted on the paper, and displayed fluorescence under 365 nm UV light. The fluorescence intensity increased and then decreased with the increase of F8BT content. When the mass content of PFO was 96% and the mass content of F8BT was 4%, the fluorescence intensity was highest. As the mass content of F8BT increased, the fluorescence lifetime of the aqueous fluorescent ink gradually decreased. It can be seen from FIG. 5 that the aqueous fluorescent ink provided by the present disclosure showed different colors under 365 nm UV light with different mass contents of PFO and F8BT.

Figure 7:
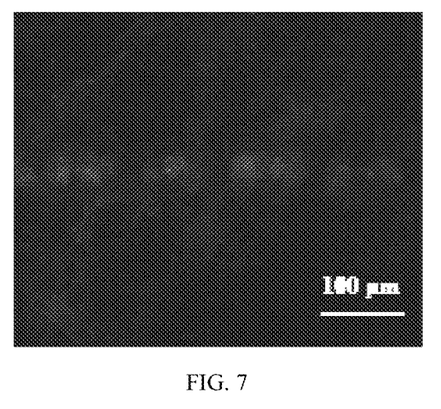
FIG. 7 shows the color development of the lines printed with the printing ink in Example 9 on the paper under a fluorescence microscope at 365 nm.

The printing ink in Example 9 was used to print lines on the paper base, and the lines were observed under a fluorescent microscope at 365 nm to measure the line width accuracy. The detection result was shown in FIG. 7. It can be seen from FIG. 7 that the line width accuracy of the aqueous fluorescent ink provided by the present disclosure can reach 30 μm, which can help realize large-format ultra-high-precision patterned anti-counterfeiting encryption printing.

Figure 8:
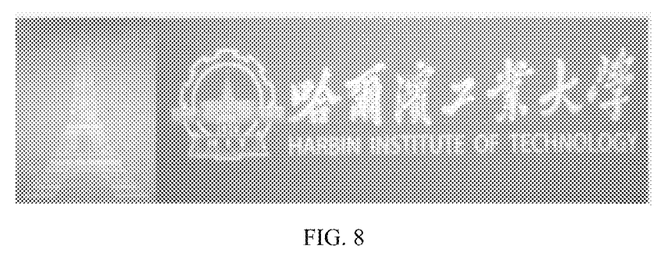
FIG. 8 shows the display of the pattern printed with the printing ink in Example 9 under 365 nm UV light.

The printing ink in Example 9 was used to print different patterns with a precision ink-jet printer and the color development was detected under 365 nm UV light. The detection result was shown in FIG. 8. It can be seen from FIG. 8 that the pattern printed by the precision ink-jet printer with the aqueous fluorescent ink provided by the present disclosure was clear under UV light, and the color was uniform.

Figure 9:
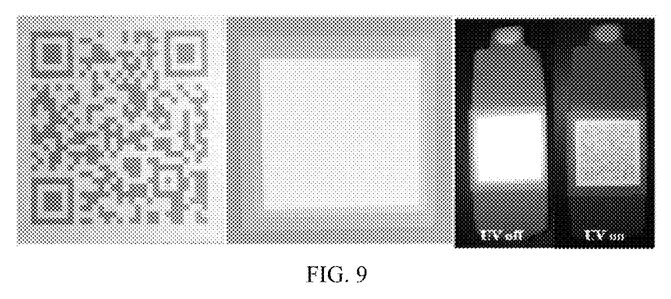
FIG. 9 shows a two-dimensional code printed with the printing ink in Example 9 and its color development with or without UV light after plastic packaging.
Figure 10:
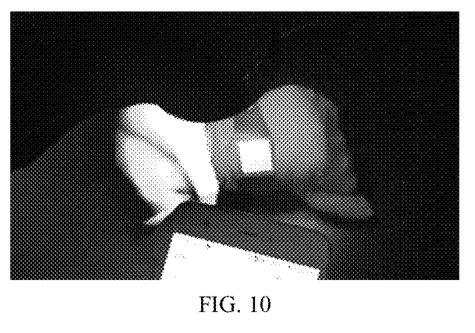
FIG. 10 shows that the two-dimensional code printed with the printing ink after plastic packaging in Example 9 is read by a mobile phone under 365 nm UV light irradiation.

The printing ink in Example 9 was used to print a two-dimensional code with a precision ink-jet printer, and after three layers were printed, the two-dimensional code was packaged with plastics, and its color development under UV light was detected. The detection results were shown in FIGS. 9 and 10. FIG. 9 showed the two-dimensional code printed with the printing ink in Example 9 and its color development with or without UV light after plastic packaging. FIG. 10 showed that the two-dimensional code printed with the printing ink in Example 9 was read by a mobile phone under 365 nm UV light irradiation after plastic packaging. It can be seen from FIG. 9 and FIG. 10 that in the two-dimensional code printed by precision ink-jet printing with the aqueous fluorescent ink provided by the present disclosure after plastic packaging, the information was hidden when there was no UV light, and fluorescence was displayed under 365 nm UV light. Under 365 nm UV light, conventional scanning software such as the mobile phone We Chat program having a scanning function can be used to scan the two-dimensional code, and then the information can be identified and read.

It can be seen that the embodiment polystyrene fluorescent micro-spheres were evenly dispersed when they are in the aqueous fluorescent ink. The fluorescent micro-spheres show a very excellent stability even after placement at room temperature for 9 days. The inks of the present disclosure were colorless and transparent under normal daylight conditions, i.e. they were completely invisible under normal daylight conditions and only showed fluorescence when irradiated by UV light, with high fluorescence intensity and long fluorescence lifetime. The accuracy of printed pattern can reach 30 μm, which can help realize large-format ultra-high-precision patterned anti-counterfeiting encryption printing. Through precision printing, the two-dimensional code can be implemented with one code for one object, with excellent anti-counterfeiting ability.

The previous statements are only the preferred embodiment of the present disclosure. It should be pointed out that for those of ordinary skill in the art, without departing from the principle of the present disclosure, several improvements and modifications can be made, and these improvements and modifications should also be regarded as within the protection scope of the present disclosure.

What is claimed is:

1. A method for preparing an aqueous fluorescent ink, comprising the following steps:
   step (1): mixing polystyrene micro-spheres with an organic solvent and a fluorescent dye to obtain a fluorescent solution;
   step (2): mixing the fluorescent solution obtained in step (1) with a surfactant and water to obtain a homogeneous system; and
   step (3): removing the organic solvent from the homogeneous system obtained in step (2) to obtain the aqueous fluorescent ink,
   wherein the aqueous fluorescent ink comprises the following components by mass content: 0.10%-0.14% of the polystyrene micro-spheres, 0.010%-0.014% of the fluorescent dye, 0.4%-0.6% of the surfactant, the balance being water,
   wherein the fluorescent dye comprises 99%-80% of poly (9,9-dioctylfluorene) and 1%-20% of poly(9,9-dioctylfluorene-co-benzothiadiazole);
   wherein the poly(9,9-dioctylfluorene) has a weight average molecular weight of 19,000-20,000 Daltons, and a polydispersity of 1.300000-1.400000; and
   the poly(9,9-dioctylfluorene-co-benzothiadiazole) has a weight average molecular weight of 48,000-49,000 Daltons, and a polydispersity of 2.000000-2.100000.

2. The method according to claim 1, wherein the aqueous fluorescent ink comprises the following components by mass content: 0.12% of the polystyrene micro-spheres, 0.012% of the fluorescent dye, 0.5% of the surfactant, the balance being water.

3. The method according to claim 1, wherein the surfactant comprises one of sodium lauryl sulfate, sodium dodecyl sulfonate and sodium dodecyl benzene sulfonate.

4. The method according to claim 1, wherein the organic solvent in step (1) is toluene or benzene.

5. The method according to claim 1, wherein, in step (3), the polystyrene fluorescent micro-spheres are crushed before the organic solvent is removed from the homogeneous system.

6. The method according to claim 1, wherein the fluorescent dye comprises 96% of poly(9,9-dioctylfluorene) and 4% of poly(9,9-dioctylfluorene-co-benzothiadiazole).

\* \* \* \* \*